United States Patent
Smiley et al.

(10) Patent No.: US 11,423,060 B2
(45) Date of Patent: Aug. 23, 2022

(54) STORING AND VERSIONING HIERARCHICAL DATA IN A BINARY FORMAT

(71) Applicant: Oracle International Corporation, Redwood Shores, CA (US)

(72) Inventors: Jack Randall Smiley, Flower Mound, TX (US); Byron Kevin McKenzie, Garland, TX (US); Anurag Garg, Cupertino, CA (US); Randy Lee Haben, Georgetown, TX (US)

(73) Assignee: Oracle International Corporation, Redwood Shores, CA (US)

( * ) Notice: Subject to any disclaimer, the term of this patent is extended or adjusted under 35 U.S.C. 154(b) by 400 days.

(21) Appl. No.: 16/541,067

(22) Filed: Aug. 14, 2019

(65) Prior Publication Data

US 2020/0110765 A1  Apr. 9, 2020

Related U.S. Application Data

(60) Provisional application No. 62/741,396, filed on Oct. 4, 2018.

(51) Int. Cl.
*G06F 16/28* (2019.01)
*G06F 16/25* (2019.01)
*G06F 16/22* (2019.01)

(52) U.S. Cl.
CPC ........ *G06F 16/288* (2019.01); *G06F 16/2282* (2019.01); *G06F 16/258* (2019.01); *G06F 16/282* (2019.01)

(58) Field of Classification Search
CPC .. G06F 16/288; G06F 16/2282; G06F 16/258; G06F 16/282; G06F 16/219
See application file for complete search history.

(56) References Cited

U.S. PATENT DOCUMENTS

| | | | | |
|---|---|---|---|---|
| 6,980,995 | B2* | 12/2005 | Charlet | G06F 16/248 707/999.005 |
| 2003/0065659 | A1* | 4/2003 | Agarwal | G06F 16/86 |
| 2007/0220022 | A1* | 9/2007 | Lankinen | G06F 16/258 |
| 2014/0059017 | A1* | 2/2014 | Chaney | G06F 16/25 707/692 |
| 2014/0095438 | A1* | 4/2014 | Marwah | G06F 16/217 707/639 |
| 2018/0307737 | A1* | 10/2018 | Xie | G06F 16/273 |

* cited by examiner

*Primary Examiner* — Cheyne D Ly
(74) *Attorney, Agent, or Firm* — Invoke

(57) ABSTRACT

A database manager is disclosed that retrieves database records having binary encoded data from a database and instantiating objects in an in-memory database. Binary encoding compresses data, allowing many subrecords to be stored a single blob field of a database record. Retrieving chunks from storage reduces transfer time by reducing the size of data and the number of operations needed to retrieve all the subrecords. The database manager receives database access requests from a database application. Changes made to the database objects and committed by the application are written back to the persistent database as versioned delta records. In a subsequent session, loading the database from storage includes first loading the most recent snapshot record, then applying changes to the data stored in delta records. The changes stored in the delta records are applied to the data in the snapshot record in the order in which they were made.

19 Claims, 6 Drawing Sheets

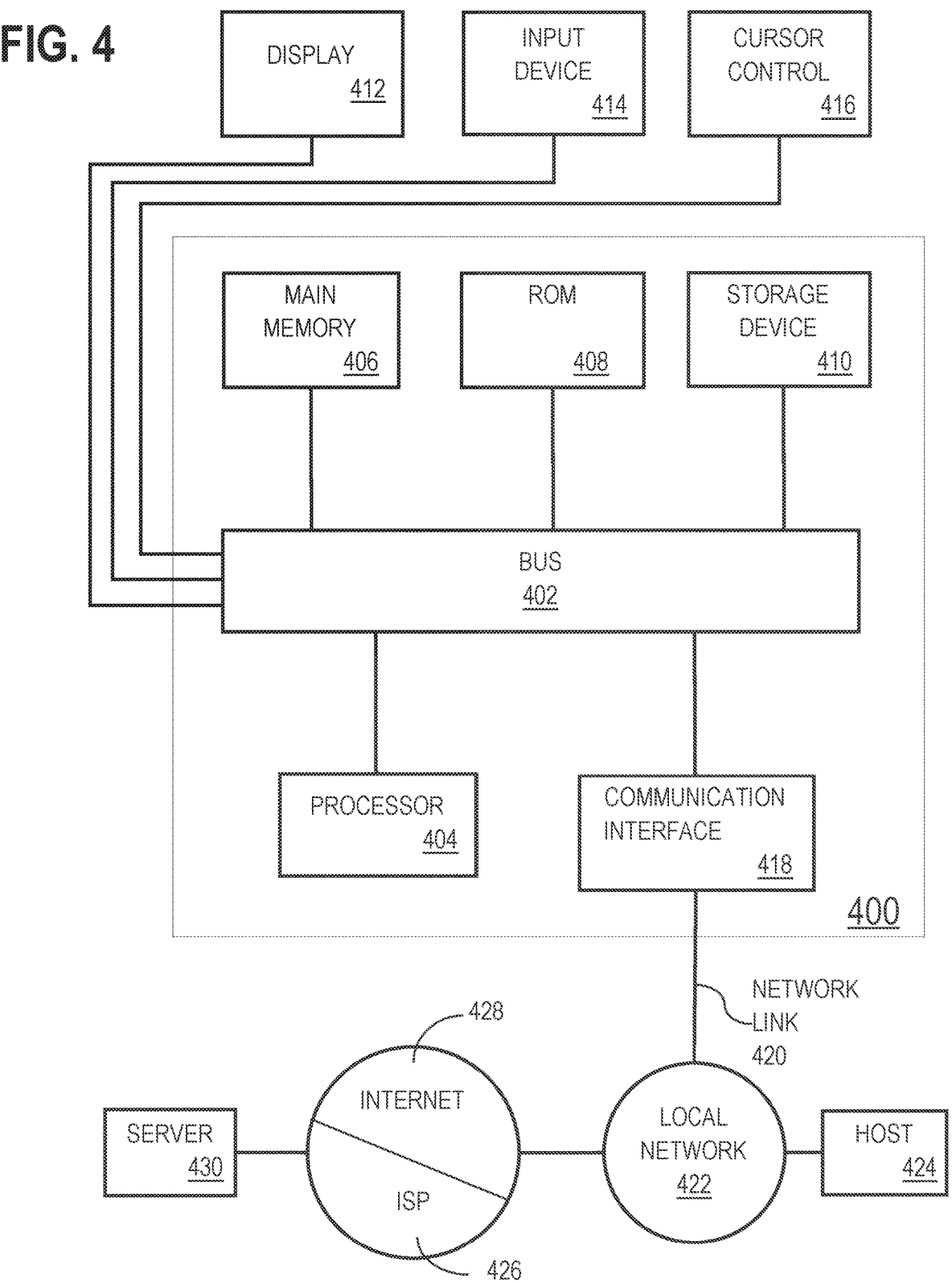

STORING AND VERSIONING HIERARCHICAL DATA IN A BINARY FORMAT

BENEFIT CLAIMS; RELATED APPLICATIONS; INCORPORATION BY REFERENCE

This application claims the benefit of U.S. Provisional Patent Application 62/741,396, filed Oct. 4, 2018, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to various techniques for managing master data sets in hierarchical data systems. Specifically, this disclosure relates to managing, storing, and versioning hierarchical data in binary form by a database application.

BACKGROUND

To improve database application response time, a database manager may create an in-memory representation of the database by instantiating one or more objects stored as records in a persistent database table. When a very large data set is stored, issues of cache management may arise. Alternatively or additionally, performance of storing data to the persistent database and/or retrieving data from the persistent database may decrease when dealing with a very large data set.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

Figure 1:
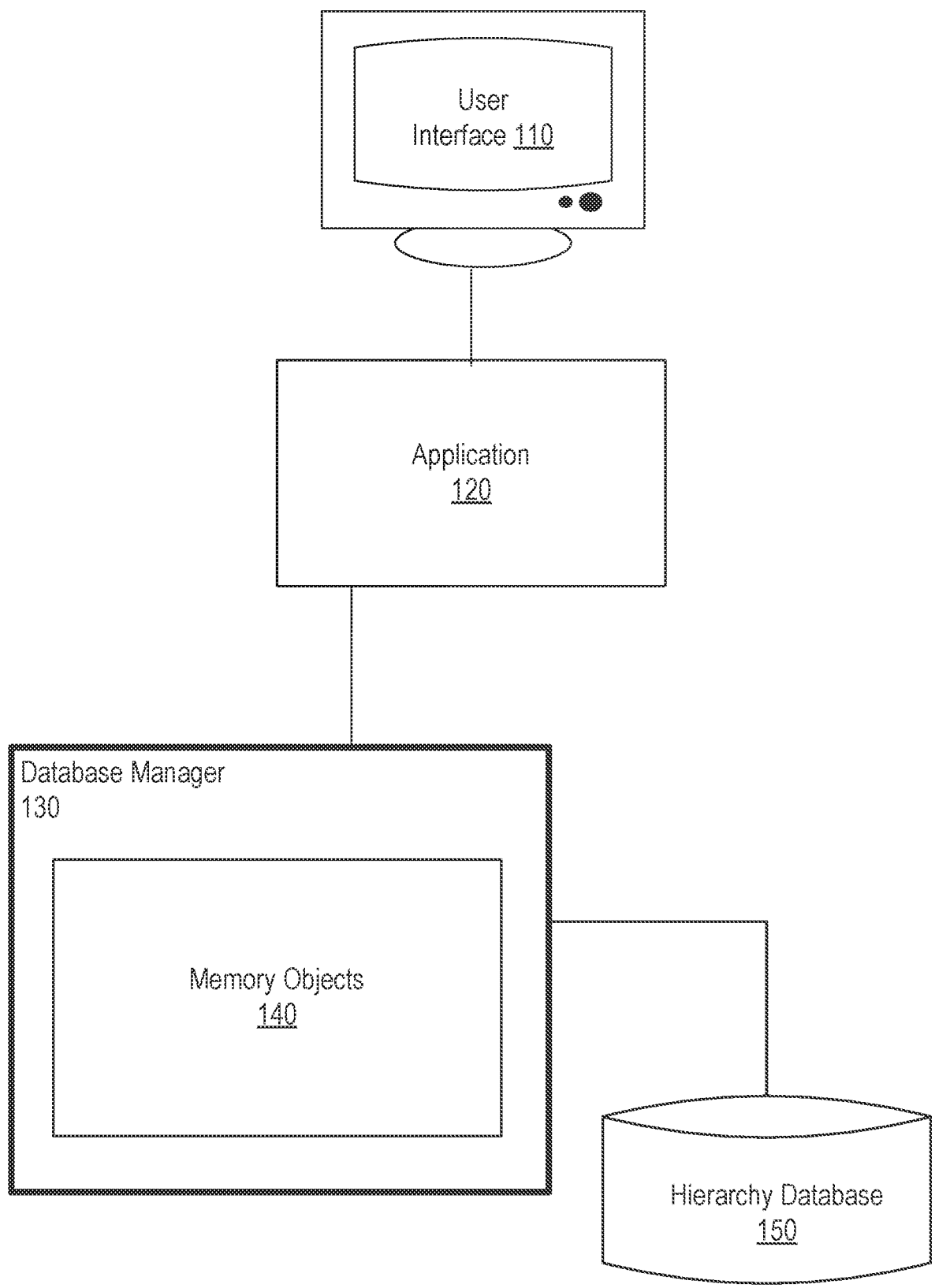
FIG. 1 is a block diagram that illustrates components of the system, in accordance with one or more embodiments.

Components illustrated in block diagrams may be added, removed, modified, or combined. Functionality described in relation to one component may instead be implemented by another component. Accordingly, the specific components illustrated and/or described herein should not be construed as limiting the scope of any of the claims. Operations illustrated in flow diagrams may be added, removed, modified, or combined. Functionality described in relation to one operation may instead be implemented by another operation. Accordingly, the specific operations illustrated and/or described herein should not be construed as limiting the scope of any of the claims.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM COMPONENTS
3. DATABASE RECORD FORMAT
3.1. NODE TYPE RECORD STRUCTURE
3.2. HIERARCHY RECORD STRUCTURE
3.3. PROPERTY RECORD STRUCTURE
4. STORING A HIERARCHY RECORD
5. VERSIONING DATABASE OBJECTS
6. COMPUTER NETWORKS AND CLOUD NETWORKS
7. HARDWARE OVERVIEW

1. General Overview

A database application allows users to add, update, and delete data (e.g., directly using a database administration tool and/or indirectly using programmatic techniques, such as a software application using a database backend). A corporate database application is an example of an application that may access very large data hierarchies. Such a database application may provide access to hierarchies of data representing client accounts, products, sales, regional offices, employees, etc. Client accounts may correspond to a hierarchy separate from a product hierarchy or employee hierarchy. Separate hierarchies may be stored within a common corporate database and managed as different views within a common user interface.

In some embodiments, several storage strategies may be used to enhance performance of instantiating in-memory database objects from a persistent relational database. Database records may be defined such that data that needs to be loaded at the same time is stored separate from data that does not need to be loaded together. This partitioning of the data reduces the number of distinct records that need to be loaded from storage on demand. In addition, the use of binary encoded data compresses data to reduce the number of bytes needed to be transferred between storage and memory. Embodiments further include storing immutable records, which requires only reading old records and writing new records, but does not require changing or deleting existing records.

Some embodiments define a new data structure for managing a hierarchy of nodes linked via parent/child relationships. Specifically, embodiments define a hierarchy record. Each hierarchy record may represent a corresponding hierarchy in a set of hierarchies. When a hierarchy is accessed by a user, a hierarchy record in a persistent database may be read into memory. The hierarchy record may contain all the nodes within the hierarchy and their respective relationships. A hierarchy may have associated metadata that indicates which node types are represented by the nodes in the hierarchy. A single record for each distinct node type may store the information for all nodes having that node type. Thus, when a hierarchy is loaded, only the records for each node type in the hierarchy may be read into memory.

In an embodiment, a node type defines a set of properties. A node may have values assigned to the properties defined for its node type. A single record for each node type/property combination may include property values for nodes of the node type. In an embodiment, no space is occupied when a node does not assign a value to a property. Only the node type/property combination records may be read into memory for the node types in the hierarchy.

In an embodiment, a hierarchy record includes a subrecord for each pair of nodes in which the pair of nodes has a parent/child relationship. Each hierarchy may have a different number of nodes and relationships between nodes. The hierarchy record may include binary encoded data that represent the relationships between nodes. New relationships may be added to the binary encoded data as they are created. As such, the binary encoded data in each hierarchy record may have a different number of subrecords. In addition, the subrecords data may be compressed, reducing the number of bytes transferred between storage and memory. The set of subrecords may be binary encoded into a "chunk" that is stored in a single field of the database record.

Embodiments use a combination of one or more immutable snapshots and one or more delta records to allow for fast and flexible versioning of the database. A new single record may be stored to update the database with changes made in one or more transactions, without deleting or changing previously written records. Using a combination of versioned snapshot and delta records, the state of a database object may be re-created at any historical point in time.

2. System Components

FIG. 1 is a block diagram that illustrates components of the system, in accordance with one or more embodiments. In one or more embodiments, the system may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In one or more embodiments, a user interface 110 refers to hardware and/or software configured to facilitate interactions between a user and an application 120. The user interface 110 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user interface 110 are specified in different languages. The behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, a user interface 110 may be specified in one or more other languages, such as Java, C, or C++.

An application 120 may be a database application, or another kind of application that is configured to use a database, and may send database queries and commands to a database manager 130. A database manager 130 may retrieve data from a hierarchy database 150 and may instantiate one or more memory objects 140. The memory object(s) 140 is/are database objects stored in a portion of memory accessible to the database manager 130.

In an embodiment, a hierarchy database 150 is any type of storage unit and/or device (e.g., a file system, database, collection of tables, or any other storage mechanism) for storing hierarchical data. Further, a hierarchy database 150 may include multiple different storage units and/or devices. The multiple different storage units and/or devices may or may not be of the same type or located at the same physical site. Further, a hierarchy database 150 may be implemented or may execute on the same computing system as one or more other components of the system illustrated in FIG. 1. Alternatively or additionally, a hierarchy database 150 may be implemented or executed on a computing system separate from one or more other components of the system illustrated in FIG. 1. A hierarchy database 150 may be communicatively coupled to one or more other components of the system via a direct connection or via a network. In an embodiment, a hierarchy database 150 is configured to receive queries in structured query language (SQL). Alternatively or additionally, a hierarchy database 150 may be configured to receive multidimensional database expression (MDX) queries and/or another kind of query or combination thereof.

In an embodiment, a hierarchy database 150 is a persistent database that stores immutable records in database tables in a relational database. Records are added to tables that represent changes to database state, but previously-written records are not changed. Objects represented as records in database tables may include node types, relationships, properties, and/or another kind of object(s) or combination thereof.

In an embodiment, a node type record defines a node type and may include a list of nodes having the node type. For example, in a geography hierarchy, a node representing a "city" may have a node type of city, and the city node type may list San Francisco, San Jose, and Oakland as nodes in the hierarchy having a city node type. A node type may define a set of properties. For example, a city node type may define properties such as city population, address of city hall, name of the mayor, etc. A distinct set of properties may be defined as appropriate for a different node type.

In an embodiment, a property record assigns property values to properties of nodes of the associated node type. For example, the node for San Francisco may assign a property value of London Breed for the city/mayor property. Different node types may have corresponding different sets of properties assigned to them. Alternatively or additionally, one or more node types may not have any properties assigned to them.

In an embodiment, a hierarchy record defines parent/child relationships between pairs of nodes. For example, if California is a node in the geographic hierarchy of node type "state," a hierarchy object may define the California node as the parent of the San Francisco node. Different hierarchy records may define many different arrangements of parent/child relationships. Alternatively or additionally, a parent node may have multiple child nodes, and/or a child node may have multiple parent nodes.

In an embodiment, a persistent database 150 may store multiple hierarchies of data that are all managed by database manager 130. When a database manager 130 receives a request from an application 120 to access a particular hierarchy, the database manager 130 may retrieve database records for that particular hierarchy from persistent storage. The database manager 130 may create in-memory database objects 140 corresponding to the database records that were retrieved.

As discussed herein, retrieving database records (e.g., by a database manager 130) refers to operations involved in (1) receiving data corresponding to the database records from a database (e.g., hierarchy database 150) and optionally (2) decoding the data to transform the database records into a format other than the format in which they were received. For example, database records may be received in a compressed and/or encrypted format. Retrieving database records may include operations to decode compressed data (i.e., apply a decompression algorithm to obtain uncompressed database records), decode encrypted data (i.e., decrypt the data using a decryption key, a password, and/or another decryption technique or combination thereof), and/or any other operation or combination thereof involved in decoding database records from the format in which they are received. As discussed herein, a database manager may receive database records in chunks (e.g., chunks corresponding to node types, hierarchies, properties, etc.) and may decode the chunks individually and/or in sets.

In an embodiment, one or more components of the system illustrated in FIG. 1 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Database Record Format

In an embodiment, each persistent database record includes at least one object identifier. An object identifier may be indexed and used for searching for the record in the database. The object may have an alphanumeric name that has meaning to a user. In an embodiment, an object identifier may be an object name. In an alternative embodiment, an object identifier may be a different index value, such as a number.

As mentioned above, each database record may include a set of subrecords. In previous approaches, the data in each subrecord was commonly stored in a separate row of a relational database table. For example, in previous approaches, a hierarchy table may have included a hierarchy identifier column, a parent column, and a child column. Each record in the hierarchy table would identify a parent node and a child node in a particular hierarchy. In at least one embodiment disclosed herein, all of the subrecords may be stored together as binary encoded data. The binary encoded data may be stored in a field of a single database record. The binary encoded data is referred to herein as a "chunk." A chunk has a format known to the database manager. The database may store and/or retrieve the binary encoded data without interpretation or transformation.

In an embodiment, the data values in each subrecord are primarily textual. Binary encoding textual data may compress the data. Using binary encoding, a number of subrecords may be stored together in a single field of a single record, rather than as separate records of a table. A different number of subrecords may be stored in each database record. Alternatively or additionally, compression may help facilitate storing a large number of subrecords in a single field. Retrieving the single record may retrieve all the subrecords, rather than having to retrieve the subrecords individually. Alternatively or additionally, the smaller size of the collective subrecords may reduce storage space and retrieval time from storage to memory.

3.1. Node Type Record Structure

Figure 2A:
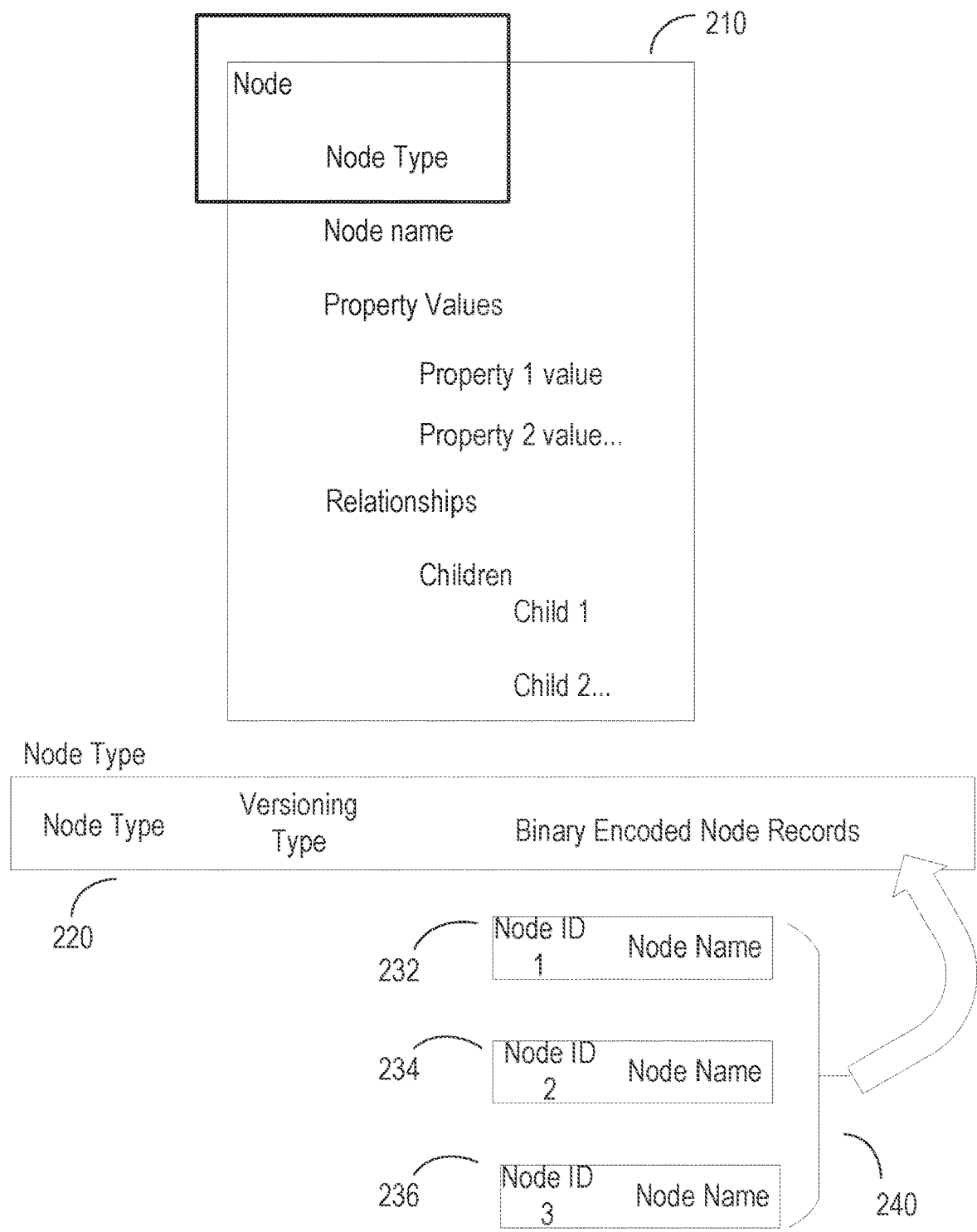
FIG. 2A is a block diagram that illustrates a node type record structure, in accordance with one or more embodiments.

FIG. 2A is a block diagram that illustrates a node type record structure, in accordance with one or more embodiments. Components and/or operations described with reference to FIG. 2A should be understood as one specific example which may not be applicable to certain embodiments. Accordingly, components and/or operations described below should not be construed as limiting the scope of any of the claims.

As illustrated in FIG. 2A, node object 210 is an example of a data node object stored in memory objects 140. The node object 210 contains, or is associated with, a node type, a set of property values for a subset of the properties associated with the node type, and a set of relationships. In the embodiment illustrated, the node object includes child relationships. Each child relationship identifies a node object that is a child of node object 210. Alternatively or additionally, node object 210 may contain or be associated with parent relationships that indicate one or more immediate parent nodes.

In an embodiment, information associated with node objects is stored across multiple persistent database records. A node type record 220 may include a node type identifier, a versioning type, and binary encoded data that includes one or more node records. Node record 232 is a record that identifies node record 232 as having the node type of the record in which it is included. In an embodiment, the node record may also include other information such as a node name. Node record 232 may be a node record corresponding to node object 210. Node record 234 may represent another node object in the hierarchy, and node record 236 may represent yet another node in the hierarchy, where the node objects represented by node records 232, 234, and 236 all have the same node type that is represented by node type record 220.

In an embodiment, all of the node records representing nodes of a particular node type are binary encoded into a single chunk 240 and inserted as a field into node type record 220. Alternatively, the node records may be partitioned and the node records in each partition may be binary encoded to corresponding chunks, with one chunk per partition entered into the record. For example, the nodes may be partitioned by the hierarchy in which they exist, and nodes within the same hierarchy may be binary encoded together. The presence of string data within a subrecord may result in variant sized subrecords within a single database record. A chunk may include a beginning and/or an end-of-subrecord indication for each subrecord. Alternatively or additionally, a chunk may include an end-of-chunk indicator for ease of identifying constituents within the chunk.

In an embodiment, a hierarchy may be associated with metadata that identifies all the distinct node types of nodes in the hierarchy. When an application requests to interact with a particular hierarchy, a database manager 130 may load the requested particular hierarchy from the persistent database. In an embodiment, storing nodes together by node type allows database manager 130 to retrieve only those records for node types represented in the requested hierarchy. Nodes of other node types need not be retrieved or loaded into memory. In an embodiment, one database record per node type may be retrieved from the database to load all the nodes in the hierarchy.

In an embodiment, a node type record structure includes information that supports mapping (optionally, 'dynamic' mapping as described below) of a hierarchy database across multiple systems. In addition, a node type record structure may define one or more constraints to limit the subset of nodes that can be used from other systems. In one example, a node in a source system stores data to be transferred to a node in a target system. In this example, the source node and the target node are named differently between the two systems, and a mapping between the two differently-named nodes is needed. Alternatively or additionally, multiple nodes in a source system may map to a single node in a target system. In an embodiment, the locations and property values of nodes in the distributed system are dynamic, i.e., change over time, such that pointers are needed to (a) determine each node's location at a particular time and/or (b) be able to reference the property values. A particular node type, which may be referred to as a "pointer node type" or "pointer node class," may correspond to nodes that store pointers to other nodes in the other system. Specifically, a particular node object of the pointer node type, stored at one system (which may be referred to as the "target system"), may include a pointer to another node stored at another system (which may be referred to as the "source system"). The pointer from the source system includes data that identifies the specific node in the target system, such as a System Identifier, Internet Protocol (IP) address, machine name, Unique Node Identifier, reference to a distributed heap, and/or any other kind of data or combination thereof that 'points to' the location of a node at another machine in an external system. In an embodiment, a pointer node type allows node information to be retrieved as needed from the source system node, when it is used in the target system.

In an embodiment, a node type record structure includes information that supports multi-segment nodes, where each segment is made up of a pointer node type. Multi-segment nodes allow for mapping of multiple nodes from a source system to (a) a single node in a target system and/or (b) a multi-segment node in the target system. As one example, multi-segment nodes may be used to map from a five-segment general ledger system to a four-segment system or a one-segment system. Alternatively or additionally, multi-segment nodes may be used to determine allowed combinations of nodes within a single system. Segments of a multi-segment node may point to nodes of different node types within the same system. A particular node type, which may be referred to as a "multi-segment node type" or "multiple segment node type" may correspond to nodes that use two or more pointer node types, storing pointers to other nodes in the other systems and/or other nodes of different node types in the same system.

3.2. Hierarchy Record Structure

Figure 2B:
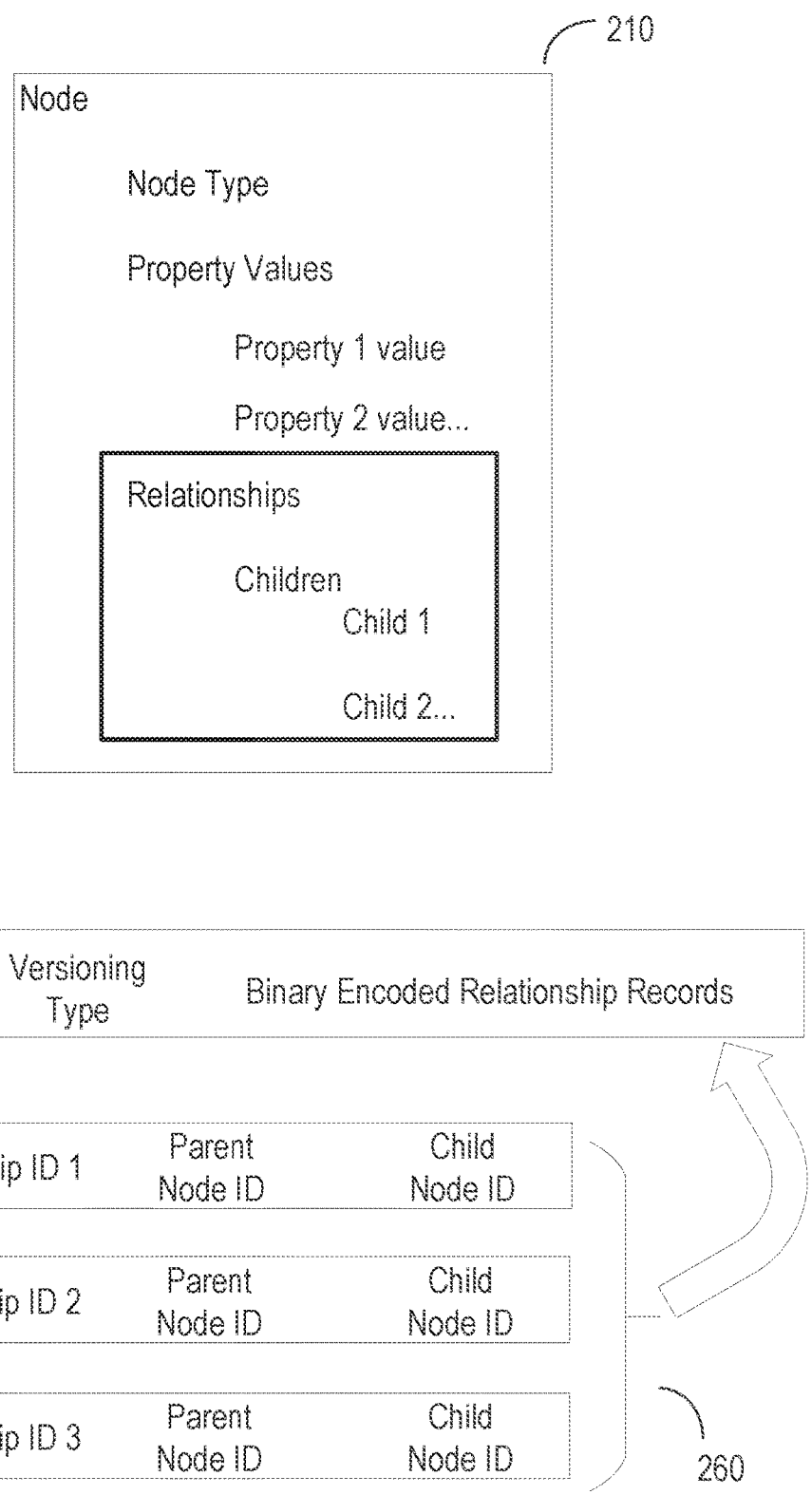
FIG. 2B is a block diagram that illustrates a hierarchy record structure, in accordance with one or more embodiments.

FIG. 2B is a block diagram that illustrates a hierarchy record structure, in accordance with one or more embodiments. Components and/or operations described with reference to FIG. 2B should be understood as one specific example which may not be applicable to certain embodiments. Accordingly, components and/or operations described below should not be construed as limiting the scope of any of the claims.

In an embodiment, a hierarchy record stores information about a particular hierarchy, including parent/child node relationship information. A hierarchy record 240 may include a hierarchy identifier, a versioning type, and binary encoded data that includes one or more relationship records. A relationship record 252 may associate two nodes in the hierarchy as having a parent/child relationship. In an embodiment, the first node in the relationship record may be the parent of the second node in the relationship record. For example: relationship record 252 may represent the parent/child relationship between node object 210 (which is the parent node in this example) and child 1; relationship record 254 may represent the parent/child relationship between node object 210 and child 2. A parent node may also be a child node. For example, relationship record 256 may represent the parent/child relationship between the parent of node object 210 and node object 210 (which is the child node in this example).

In an embodiment, all of the relationship records representing parent/child relationships in the particular hierarchy are binary encoded into a single chunk 260 and inserted as a field into hierarchy record 240. In an embodiment, when database manager 130 receives an application request to interact with a particular hierarchy, a single database record may be retrieved to identify all parent/child relationships between nodes in the hierarchy.

3.3. Property Record Structure

Figure 2C:
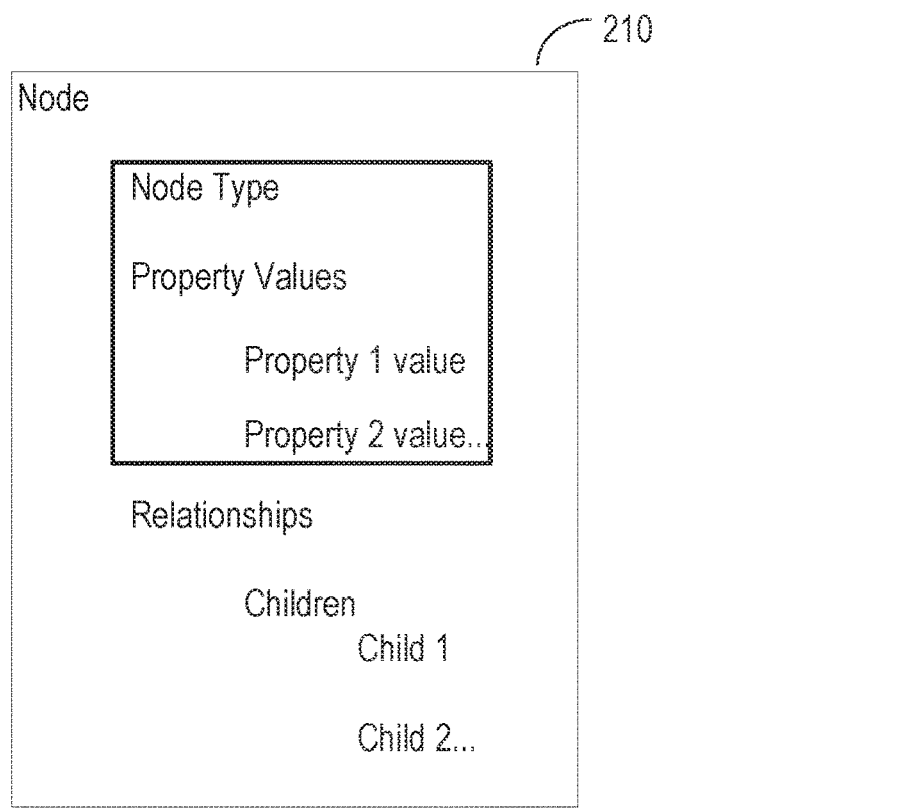
FIG. 2C is a block diagram that illustrates a property record structure, in accordance with one or more embodiments.
Figure 2C:
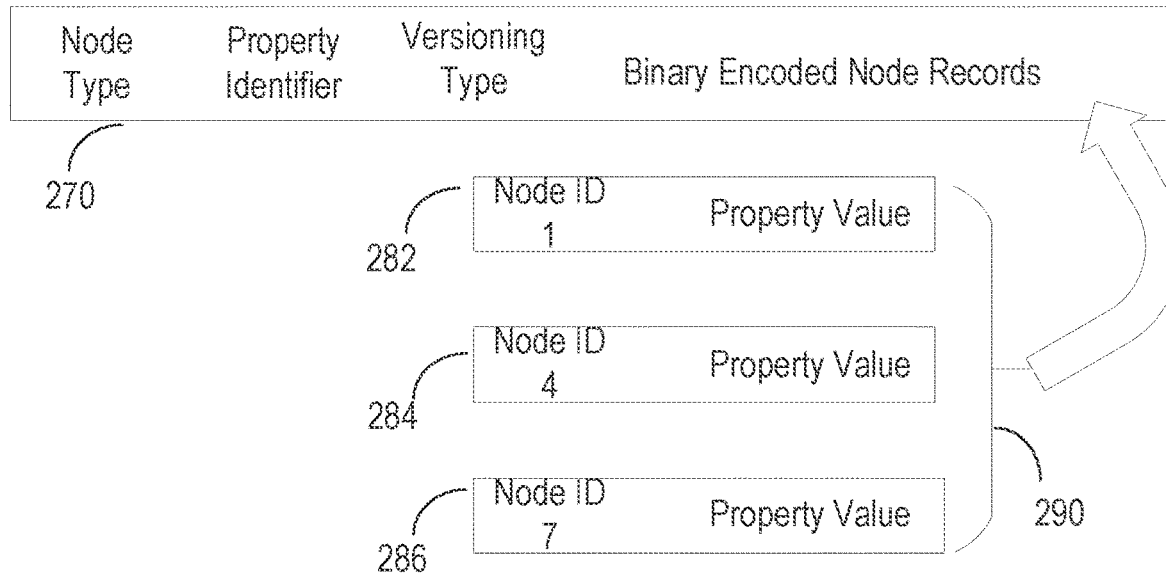

FIG. 2C is a block diagram that illustrates a property record structure, in accordance with one or more embodiments. Components and/or operations described with reference to FIG. 2C should be understood as one specific example which may not be applicable to certain embodiments. Accordingly, components and/or operations described below should not be construed as limiting the scope of any of the claims.

In an embodiment, a property record is a persistent data record that stores information about the hierarchy of nodes. A property record stores property values assigned to node properties. A node type defines a set of properties, though a property may be defined by multiple node types. Thus, a property record stores property value information for a property in the context of a particular node type. The property values stored in a property record may only be assigned to nodes having the particular node type; however, not every property of every node may be assigned a value. Thus, in an embodiment, no space is consumed for node properties having no assigned value.

In an embodiment, property record 270 includes a node type identifier, a property identifier, a versioning type, and binary encoded data that includes one or more property value records. Property value record 282 includes a node identifier ("ID") and a property value. The property value is assigned to the property in the particular node.

In an embodiment, all of the property value records that assign property values to properties of nodes of particular node type are binary encoded into a single chunk 290 and inserted as a field into property record 270.

In an embodiment, an application 120 may support different views of hierarchical data. Certain property values may be restricted from display in certain views. Thus, the number of properties needed to be loaded may depend on the view from which the application request originates. Storing a separate record of property values for each property allows loading only those property values that may be displayed in the view requesting the data. Because there may be a very large number of property values, avoiding unnecessary retrieval and loading of property values may enhance performance and ease cache management.

4. Storing a Hierarchy Record

Figure 3:
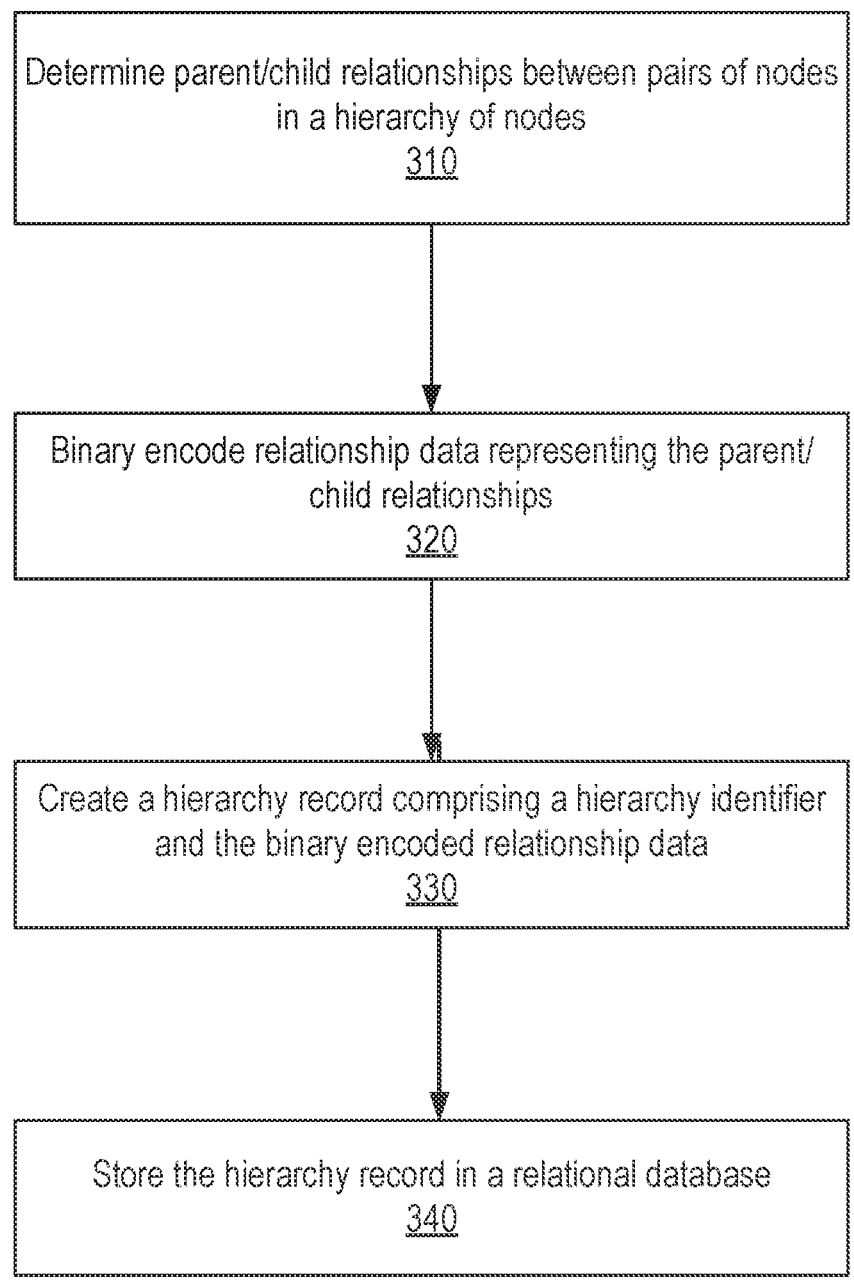
FIG. 3 illustrates an example set of operations for storing a hierarchy record in a relational database, in accordance with one or more embodiments.

FIG. 3 illustrates an example set of operations for storing a hierarchy record in a database table of a relational database, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, one or more operations described herein for storing and/or retrieving database records are performed by a database manager (e.g., database manager 130 of FIG. 1). In general, in an embodiment, one or more operations described herein may be performed by any system component that is configured to communicate with a database that stores hierarchical data (e.g., hierarchy database 150 of FIG. 1).

In an embodiment, the example set of operations illustrated in FIG. 3 corresponds to a process for persisting in-memory database objects. In an embodiment, in Operation 310, parent/child relationships are identified between nodes in a particular hierarchy. Examples of parent/child relationships are described above. In an embodiment, in Operation 320, the parent/child relationships, together as a set, are binary encoded as a single chunk. Alternatively, parent/child relationships may be partitioned between different chunks, according to one or more criteria. The chunk(s) may include indexing information to identify the start of each parent/child relationship for later decoding. In an embodiment, in Operation 330, a binary encoded chunk is placed in a hierarchy record that includes at least a hierarchy identifier. Examples of hierarchy records are described above. In an embodiment, in Operation 340, the hierarchy record is stored in a table in a persistent relational database. Some examples of techniques for versioning database objects in a persistent database are described below.

5. Versioning Database Objects

In an embodiment, a database record includes a versioning type field that indicates whether the database record is a snapshot record or a delta record. The node type, hierarchy, and property database records discussed above may correspond to snapshot type records that collectively include all the data for the hierarchy objects. For each snapshot record format, there may be a corresponding set of delta records. Delta records may store committed changes to the database objects made by an application. That is, delta records may contain only the portion(s) of a snapshot record that have changed. The delta record format differs from its corresponding snapshot record format in that (a) the versioning type field indicates that it is a delta record instead of a snapshot record and (b) the subrecords of a delta record represent changes to subrecords in the corresponding snapshot record. Each subrecord in a delta record may include an operation that was performed, an identifier of the object on which the operation was performed, and an optional value.

As one example, a node representing the city of San Francisco may have a mayor property with a value "Ed Lee." If the value "Ed Lee" is replaced with the value "London Breed," then a subrecord in a city/mayor delta record may include the subrecord (update, San Francisco, London Breed). Other subrecords in the same delta record may include (delete, San Jose, Sam Liccardo) and (add, Oakland, Libby Schaaf). The set of subrecords in a delta record may be binary encoded and stored as a chunk in a single field of the delta record.

In an embodiment, snapshot and delta type records stored in a relational table may be immutable and may include a version indicator. The version indicator is a way to determine a relative ordering among the records and to identify the most current (latest) record of that record type. A version indicator may be a timestamp or an ordinal version label, such as a number or alpha-numeric value. When multiple node type, hierarchy, and/or property snapshot records co-exist within the same table, the snapshot record having the most recent version indicator may be considered the authoritative copy. A delta record may have changes to only certain values in the corresponding snapshot record. The current state of a database object may be determined by starting with the latest (authoritative) snapshot record and applying changes specified in the corresponding delta records that were created after the authoritative snapshot record. The delta records may be applied in order of their respective version indicator.

In an embodiment, a new snapshot record may be created based on the current state of the in-memory objects (representing the state of the database object after the changes have been made). Many different kinds of events may trigger the creation of a new snapshot record. For example, in an embodiment, creation of a new snapshot record may be triggered by the accumulation of a predefined threshold number of associated delta records. The threshold number of records may be defined prior to a particular instance of creating a snapshot. The threshold number of records may be defined in code and/or user-configurable by a set of one or more authorized database administrators via a database manager. Alternatively or additionally, the threshold number of records may be dynamic, i.e., changing over time based on one or more system conditions.

In another embodiment, a new snapshot record may be created when the time to instantiate in-memory objects from a snapshot record and associated delta records in the database exceeds a predefined or dynamic threshold. The threshold amount of time may be defined prior to a particular instance of creating a snapshot. The threshold amount of time may be defined in code and/or user-configurable by a set of one or more authorized database administrators via a database manager. Alternatively or additionally, the threshold amount of time may be dynamic, i.e., changing over time based on one or more system conditions. A newly added snapshot record replaces the previous snapshot record as the authoritative record, but the previous snapshot record may not be deleted.

In an embodiment, using a versioning labelling scheme, the latest snapshot record may be determined as well as the set of delta records that were created since the latest snapshot. In addition, the version labelling scheme may be used to identify the order in which delta records are to be applied to the authoritative snapshot record. When a timestamp is used as a version indicator, a version of the database object may be instantiated in the state that it existed as of a particular point in time. When a version label is used as a version indicator, a version of the database object may be instantiated in the state that it existed as of a particular version. In an embodiment, version labels may be associated with a timestamp, allowing a user to specify the desired state of an object based on time or version.

In an embodiment, to create a database object in its state a particular time t in the past, the most recent snapshot record is found prior to or at time t. Next, the changes recorded in subsequent delta records up to and including at time t are applied in order of their creation.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or in addition, the computer system 400 may receive user input via a cursor control 416, such as a mouse, a trackball, a trackpad, a touchscreen, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The display 412 may be configured to receive user input via one or more pressure-sensitive sensors, multi-touch sensors, and/or gesture sensors. Alternatively or in addition, the computer system 400 may receive user input via a microphone, video camera, and/or some other kind of user input device (not shown).

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 400 can receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    creating a hierarchy record for a hierarchy in a plurality of hierarchies, the hierarchy record comprising at least a hierarchy identifier and a first binary encoded chunk of data, the hierarchy comprising a plurality of nodes, each node in the plurality of nodes being associated with at least:
      (a) an identifier;
      (b) a parent-child relationship with at least one other node in the hierarchy;
    determining a plurality of relationship objects for the hierarchy, each relationship object of the plurality of relationship objects comprising a pair of node identifiers, each node identifier being associated with a respective node;
    creating, by a database manager executing on an operating system, binary encoded relationship data representing the plurality of relationship objects for the hierarchy;
    storing in the hierarchy record: (a) the hierarchy identifier as a text value and (b) the binary encoded relationship data as the first binary encoded chunk of data;

storing the hierarchy record in a first relational database table;

retrieving a first hierarchy record from the first relational database table;

decoding the first binary encoded chunk of data in the retrieved first hierarchy record to generate decoded relationship data; and creating an in-memory representation of the hierarchy based on the decoded relationship data.

2. The one or more media of claim 1, wherein the hierarchy identifier comprises a text value.

3. The one or more media of claim 1, wherein the first relational database table stores a plurality of hierarchy records.

4. The one or more media of claim 1, wherein each node of the plurality of nodes further comprises a node type defining a set of one or more properties; the one or more media further storing instructions which, when executed by one or more processors, cause:

storing, in association with the hierarchy, a list of node types of nodes in the hierarchy;

creating a node type record for a particular node type comprising a node type identifier and a second binary encoded chunk of data;

determining a plurality of nodes of the particular node type, each node of the plurality of nodes of the particular node type comprising a node identifier and a textual node name;

creating binary encoded node data representing the plurality of nodes of the particular node type;

storing in the node type record: (a) the node type identifier as a text value and (b) the binary encoded node data as the second binary encoded chunk of data; and storing the node type record in a second relational database table.

5. The one or more media of claim 4, wherein:

the database manager maintains a first hierarchy and a second hierarchy;

the second relational database table stores a plurality of node type records, wherein a first node type record includes data for a first node type and a second node type record includes data for a second node type;

a first node having the first node type is included in the first hierarchy;

a second node having the first node type is included in the second hierarchy;

the first hierarchy includes a third node of the second node type; and the second hierarchy has no node of the second node type.

6. The one or more media of claim 4, wherein each node of the plurality of nodes further comprises zero or more alphanumeric property values assigned to properties associated with the node type of said each node; the one or more media further storing instructions which, when executed by one or more processors, cause:

creating a property record for a particular property of the particular node type of said each node, the property record comprising at least (a) a node type identifier of the particular node type, (b) a property identifier of the particular property, and (c) a third binary encoded chunk of data;

determining for each of a plurality of nodes of the particular node type, a respective property value for the particular property;

creating binary encoded property value data representing the plurality of nodes of the particular node type and the respective property value for the particular property;

storing in the property record: (a) the property identifier as a text value and (b) the binary encoded property value data as the third binary encoded chunk of data; and storing the property record in a third relational database table.

7. The one or more media of claim 6, further storing instructions which, when executed by one or more processors, cause:

receiving, from an application, a request to view data stored in a particular hierarchy;

finding, in the first relational database table, a second hierarchy record for the particular hierarchy;

decoding a first binary encoded chunk of data included in the second hierarchy record, to retrieve a plurality of decoded relationship objects;

creating a first in-memory node object and a second in-memory node object, wherein the first node object is identified by a first node identifier and the second node object is identified by a second node identifier, wherein the first node identifier and the second node identifier are a pair of node identifiers within a relationship object of the plurality of decoded relationship objects;

associating with the first in-memory node object an indication that the first node object is a parent of the second node object;

for each node type in the list of node types in the particular hierarchy:

retrieving a node type record from the second relational database table;

decoding the second binary encoded chunk of data from the node type record to extract a plurality of node identifiers; and identifying in-memory node objects identified by a respective node identifier in the plurality of node identifiers, and associating each identified in-memory node object with the particular node type;

retrieving from the third relational database table a plurality of property records, each property record of the plurality of property records corresponding to a node type in the list of node types in the particular hierarchy;

retrieving from a property record of the plurality of property records, a property identifier identifying a particular property and the third binary encoded chunk of data from the property record;

decoding the third binary encoded chunk of data to create one or more property value objects, each property value object comprising a node identifier and a corresponding property value;

for each property value object of the one or more property value objects:

identifying the in-memory node object identified by the node identifier in said each property value object; and assigning the corresponding property value to the particular property associated with the in-memory node object.

8. The one or more media of claim 7, further storing instructions which, when executed by one or more processors, cause:

receiving, from the application, a database request to receive information about a requested node in the particular hierarchy;

responsive to receiving the request, identifying the in-memory node object, and transmitting the information stored in the in-memory node object in response to the database request.

9. The one or more media of claim 8, wherein the database request is an SQL query.

10. A system comprising:
at least one hardware device including a processor;
the system being configured to perform operations comprising:
creating a hierarchy record for a hierarchy in a plurality of hierarchies, the hierarchy record comprising at least a hierarchy identifier and a first binary encoded chunk of data, the hierarchy comprising a plurality of nodes, each node in the plurality of nodes being associated with at least:
(a) an identifier;
(b) a parent-child relationship with at least one other node in the hierarchy;
determining a plurality of relationship objects for the hierarchy, each relationship object of the plurality of relationship objects comprising a pair of node identifiers, each node identifier being associated with a respective node;
creating, by a database manager executing on an operating system, binary encoded relationship data representing the plurality of relationship objects for the hierarchy;
storing in the hierarchy record: (a) the hierarchy identifier as a text value and (b) the binary encoded relationship data as the first binary encoded chunk of data;
storing the hierarchy record in a first relational database table;
retrieving a first hierarchy record from the first relational database table;
decoding the first binary encoded chunk of data in the retrieved first hierarchy record to generate decoded relationship data; and
creating an in-memory representation of the hierarchy based on the decoded relationship data.

11. The system of claim 10, wherein the hierarchy identifier comprises a text value.

12. The system of claim 10, wherein the first relational database table stores a plurality of hierarchy records.

13. The system of claim 10, wherein each node of the plurality of nodes further comprises a node type defining a set of one or more properties; the operations further comprising:
storing, in association with the hierarchy, a list of node types of nodes in the hierarchy;
creating a node type record for a particular node type comprising a node type identifier and a second binary encoded chunk of data;
determining a plurality of nodes of the particular node type, each node of the plurality of nodes of the particular node type comprising a node identifier and a textual node name;
creating binary encoded node data representing the plurality of nodes of the particular node type;
storing in the node type record: (a) the node type identifier as a text value and (b) the binary encoded node data as the second binary encoded chunk of data; and
storing the node type record in a second relational database table.

14. The system of claim 13, wherein:
the database manager maintains a first hierarchy and a second hierarchy;
the second relational database table stores a plurality of node type records, wherein a first node type record includes data for a first node type and a second node type record includes data for a second node type;
a first node having the first node type is included in the first hierarchy;
a second node having the first node type is included in the second hierarchy;
the first hierarchy includes a third node of a second node type; and
the second hierarchy has no node of the second node type.

15. The system of claim 13, wherein each node of the plurality of nodes further comprises zero or more alphanumeric property values assigned to properties associated with the node type of said each node; the operations further comprising:
creating a property record for a particular property of the particular node type of said each node, the property record comprising at least (a) a node type identifier of the particular node type, (b) a property identifier of the particular property, and (c) a third binary encoded chunk of data;
determining for each of a plurality of nodes of the particular node type, a respective property value for the particular property;
creating binary encoded property value data representing the plurality of nodes of the particular node type and the respective property value for the particular property;
storing in the property record: (a) the property identifier as a text value and (b) the binary encoded property value data as the third binary encoded chunk of data; and
storing the property record in a third relational database table.

16. The system of claim 15, the operations further comprising:
receiving, from an application, a request to view data stored in a particular hierarchy;
finding, in the first relational database table, a second hierarchy record for the particular hierarchy;
decoding a first binary encoded chunk of data included in the second hierarchy record, to retrieve a plurality of decoded relationship objects;
creating a first in-memory node object and a second in-memory node object, wherein the first node object is identified by a first node identifier and the second node is identified by a second node identifier, wherein the first node identifier and the second node identifier are a pair of node identifiers within a relationship object of the plurality of decoded relationship objects;
associating with the first in-memory node object an indication that the first node object is a parent of the second node object;
for each node type in the list of node types in the particular hierarchy:
retrieving a node type record from the second relational database table;
decoding the second binary encoded chunk of data from the node type record to extract a plurality of node identifiers; and
identifying in-memory node objects identified by a respective node identifier in the plurality of node identifiers, and associating each identified in-memory node object with the particular node type;
retrieving from the third relational database table a plurality of property records, each property record of the plurality of property records corresponding to a node type in the list of node types in the particular hierarchy;

retrieving from a property record of the plurality of property records, a property identifier identifying a particular property and the third binary encoded chunk of data from the property record;

decoding the third binary encoded chunk of data to create one or more property value objects, each property value object comprising a node identifier and a corresponding property value;

for each property value object of the one or more property value objects:
identifying the in-memory node object identified by the node identifier in said each property value object; and
assigning the corresponding property value to the particular property associated with the in-memory node object.

17. The system of claim 16, the operations further comprising:
receiving, from the application, a database request to receive information about a requested node in the particular hierarchy;
responsive to receiving the request, identifying the in-memory node object, and
transmitting the information stored in the in-memory node object in response to the database request.

18. A method comprising:
creating a hierarchy record for a hierarchy in a plurality of hierarchies, the hierarchy record comprising at least a hierarchy identifier and a first binary encoded chunk of data, the hierarchy comprising a plurality of nodes, each node in the plurality of nodes being associated with at least:
(a) an identifier;
(b) a parent-child relationship with at least one other node in the hierarchy;
determining a plurality of relationship objects for the hierarchy, each relationship object of the plurality of relationship objects comprising a pair of node identifiers, each node identifier being associated with a respective node;
creating, by a database manager executing on an operating system, binary encoded relationship data representing the plurality of relationship objects for the hierarchy;
storing in the hierarchy record: (a) the hierarchy identifier as a text value and (b) the binary encoded relationship data as the first binary encoded chunk of data;
storing the hierarchy record in a first relational database table;
retrieving a hierarchy record from the first relational database table;
decoding the first binary encoded chunk of data in the retrieved hierarchy record to generate decoded relationship data; and creating an in-memory representation of the hierarchy based on the decoded relationship data,
wherein the method is performed by at least one device including a hardware processor.

19. One or more non-transitory machine-readable media storing instructions which, when executed by one or more processors, cause:
creating a hierarchy record for a hierarchy in a plurality of hierarchies, the hierarchy record comprising at least a hierarchy identifier and a first binary encoded chunk of data, the hierarchy comprising a plurality of nodes, each node in the plurality of nodes being associated with at least:
(a) an identifier;
(b) a parent-child relationship with at least one other node in the hierarchy;
determining a plurality of relationship objects for the hierarchy, each relationship object of the plurality of relationship objects comprising a pair of node identifiers, each node identifier being associated with a respective node;
creating, by a database manager executing on an operating system, binary encoded relationship data representing the plurality of relationship objects for the hierarchy;
storing in the hierarchy record: (a) the hierarchy identifier as a text value and (b) the binary encoded relationship data as the first binary encoded chunk of data; and
storing the hierarchy record in a first relational database table,
wherein each node of the plurality of nodes further comprises a node type defining a set of one or more properties, and
wherein the instructions, when executed by the one or more processors, further cause:
storing, in association with the hierarchy, a list of node types of nodes in the hierarchy;
creating a node type record for a particular node type comprising a node type identifier and a second binary encoded chunk of data;
determining a plurality of nodes of the particular node type, each node of the plurality of nodes of the particular node type comprising a node identifier and a textual node name;
creating binary encoded node data representing the plurality of nodes of the particular node type;
storing in the node type record: (a) the node type identifier as a text value and (b) the binary encoded node data as the second binary encoded chunk of data; and
storing the node type record in a second relational database table.

* * * * *